United States Patent [19]

Moro et al.

[11] Patent Number: 5,457,145
[45] Date of Patent: Oct. 10, 1995

[54] REINFORCED POLYOLEFINIC THERMOPLASTIC COMPOSITION

[75] Inventors: Alessandro Moro, Venice; Paolo Venti, Padova; Domenico Vianello, Venice; Roberto Pippa; Marco Scapin, both of Venice, all of Italy

[73] Assignees: Enichem S.p.A; Eniricerche S.p.A, both of Milan, Italy

[21] Appl. No.: 202,594

[22] Filed: Feb. 28, 1994

[30] Foreign Application Priority Data

Mar. 11, 1993 [IT] Italy ................... 93A000467

[51] Int. Cl.⁶ .................. C08K 3/26; C08K 5/54
[52] U.S. Cl. .................. 524/188; 524/424; 524/425
[58] Field of Search .................. 524/188, 425, 524/424; 523/213, 203

[56] References Cited

U.S. PATENT DOCUMENTS

| RE. 31,992 | 9/1985 | Ancker et al. | 524/425 |
| 4,385,136 | 5/1983 | Ancker et al. | 524/425 |
| 4,429,064 | 1/1984 | Marzola et al. | 523/213 |

FOREIGN PATENT DOCUMENTS

| 0069937 | 1/1983 | European Pat. Off. . |
| 0370551 | 5/1990 | European Pat. Off. . |

OTHER PUBLICATIONS

Chemical Abstracts, vol. 109, No. 18, Oct. 31, 1988, AN 150544p.
Chemical Abstracts, vol. 100, No. 18, Apr. 30, 1984, AN 140173S.
Chemical Abstracts, vol. 117, No. 18, Nov. 2, 1992, AN 17284u.
Database WPI, Derwent Publications Ltd., AN 84–246084, JP-A-59147035, Aug. 23, 1984.

*Primary Examiner*—Tae H. Yoon
*Attorney, Agent, or Firm*—Oblon, Spivak, McClelland, Maier & Neustadt

[57] ABSTRACT

Reinforced polyolefinic thermoplastic composition comprising a polyolefin, a carbonate of a metal appertaining to IIa Group of the Periodic System and a maleamic silane having general formula:

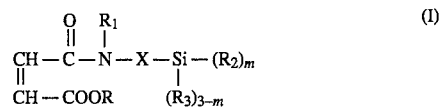

wherein R and $R_1$ are hydrogen or an alkyl radical; $R_2$ is an alkoxy hydrolysable group or a halogen atom; $R_3$ is an alkyl radical having from 1 to 8 carbon atoms; X may be a radical of formula:

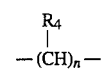

or an aromatic, cycloaliphatic o heterocyclic divalent radical.

9 Claims, No Drawings

REINFORCED POLYOLEFINIC THERMOPLASTIC COMPOSITION

The present invention relates to reinforced polyolefinic thermoplastic compositions.

More in particular, the present invention relates to reinforced polyolefinic thermoplastic compositions adapted to be fabricated into articles having mechanical properties of resilience, especially at temperatures lower than 0° C., that are more superior than those of the corresponding un-reinforced polyolefinic compositions.

As is known, polyolefins are used in a wide variety of end uses including in the form of films, fibers, moulded or thermoformed articles, pipes and/or coatings. In some of these end-uses, especially when the polyolefin is fabricated into shaped articles by moulding techniques, it is requested that the article to be moulded exhibits stiffness and toughness properties that are superior to those obtainable from the starting polyolefin alone.

Many techniques for the modification of the properties of polyolefins are known and described in the literature; they include the cross-linking of the polymer or the incorporation of additives, such as for example elastomers, or fillers such as for example glass fibers, kaolin, mica, oxides, carbonates of the second and third group Periodic System metals and so forth, into the polymeric matrix. Generally, the polyolefinic compositions reinforced with fillers tend to exhibit a higher stiffness than that of the starting polymer alone as well as an improved dimensional stability of the end products.

It is known, however, that the polyolefins, due to their apolar character, are not suited for being reinforced by inorganic additives or fillers; in fact, the increase in stiffness and dimensional stability is usually accompanied by a decrease in other important properties including toughness, resilience and so forth.

In order to obviate such a drawback it had been suggested either to modify the olefinic polymer by grafting monomers having polar groups onto the hydrocarbon chain, or by using a so-called "adhesion promoter", namely a compound which imply an increased adhesion or bonding between the filler and the polymeric matrix.

Thus, for example, G.B. Patent Nos. 1,110,930 and 1,177,200 disclose reinforced compositions comprising a polyolefin, an inorganic filler and an organosilane containing a hydrolysable group capable of reacting with the hydroxyl groups present in the inorganic filler.

Czechoslovak Patent No. 192,875 discloses mixtures of polyethylene and kaolin modified by a basic silane.

U.S. Pat. No. 3,956,230 discloses polymeric compositions, such as for example polyolefins, reinforced with a filler containing hydroxyl groups. The filler is made compatible with the polymer by mixing polymer and filler in the presence of a coupling agent, such as for example maleic anhydride, and a free radical initiator.

G.B. Patent No. 2,225,328 discloses reinforced compositions comprising polyethylene modified by grafting at least one of an ethylenically unsaturated carboxylic acid or carboxylic acid anhydride, and an aluminium silicate having the surface treated with an amino-silane compound.

Published European Patent Application No. 0 171 513 discloses reinforced compositions comprising a polyolefin, a carbonate of a Periodic System IIa Group metal and a compatibilizing agent consisting of at least one polyolefin grafted with carboxylic acids or anhydrides.

Japanese Patent Application No. 74-041,096, published No. 7, 1974 discloses filled polyolefin compositions obtained by reacting a polyolefin, maleic acid or anhydride and glass fibers pre-treated with an amino-silane compound.

European Patent No. 0,008,703 describes the use of a bis-maleamic acid, such as for example N,N'-hexamethylene-bis-maleamic acid, N,N'-dodecamethylene-bis-maleamic acid or N,N'-isophorone-bis-maleamic acid, as coupling agent capable of promoting the adhesion between a polyolefin and glass fibers.

U.S. Pat. No. 4,429,064 describes the use of a maleammic acid or of a maleamic silane as an agent for promoting the adhesion of the mica to the polyolefin. In the specification of the above U.S. patent it is set forth that the resulting compositions exhibit improved properties of mechanical resistance; the examples exemplify compositions having an ultimate tensile strength not higher than 419 N/mm$^2$, and an IZOD resilience, determined by notched bar test, at room temperature, not higher than 3.4 Kgcm/cm, corresponding to 33.4 J/m.

The object of the present invention is to further improve the characteristics of the reinforced thermoplastic polyolefinic compositions, especially at temperatures lower than 0° C., such as at −40° C.

According to the present invention this and other objects are achieved by using at least one carbonate of a metal appertaining to the IIa Group of the Periodic System, as inorganic filler, and a maleamic silane as agent for promoting the adhesion between the inorganic filler and the polyolefin.

The subject matter of the present invention is, therefore, a reinforced polyolefinic thermoplastic composition comprising:

(A) from 30 to 98% by weight of a polyolefin selected from the group consisting of homopolymers of ethylene and copolymers of ethylene with at least one other alpha-olefin containing from 3 to 10 carbon atoms, and respectively (B) from 70 to 2% by weight of at least one carbonate of a metal appertaining to IIa Group of the Periodic System; and (C) from 0.01 to 10 parts by weight, with respect to 100 parts of (A)+(B), of a maleamic silane having general formula:

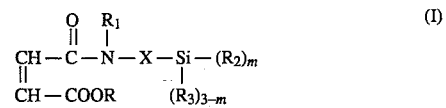

wherein:

R and $R_1$ may be independently selected from hydrogen and an alkyl radical containing from 1 to 8 carbon atoms;

$R_2$ is an alkoxy hydrolysable group containing from 1 to 6 carbon atoms or a halogen atom;

$R_3$ is an alkyl radical containing from 1 to 8 carbon atoms;

X may be a radical of formula:

or an aromatic, cycloaliphatic or heterocyclic divalent radical, wherein $R_4$ is hydrogen or an alkyl radical containing from 1 to 18 carbon atoms and n is an integer ranging from 1 to 4; and m is an integer ranging from 1 to 3, extremes included.

Particularly preferred reinforced polyolefinic compositions of the present invention are those comprising from 50 to 80% by weight of a polyolefin (A), from 50 to 20% by weight of a carbonate of a metal appertaining to IIa Group of the Periodic System (B), and from 0,05 to 5% by weight, with respect to the (A)+(B) mixture, of the maleamic silane (C) of the above reported formula (I).

Maleamic silanes of formula (I) particularly preferred in the compositions of the present invention are those wherein R and $R_1$ are hydrogen; $R_2$ is a straight or branched alkoxy radical containing from 1 to 4 carbon atoms, such as: —O—$CH_3$; —O—$C_2H_5$; —O—$C_3H_7$ or —O—$C_4H_9$; $R_4$ is hydrogen; n is 2 or 3, and 3- m is zero.

The maleamic silanes having the above reported formula (I) are products well known and available on the market.

They may be prepared according to techniques known and extensively described in literature such as, for example, in U.S. Pat. No. 4,429,064.

A method for preparing the maleamic silanes of formula (I) consists in reacting maleamic acid with a reactive organosilane of general formula:

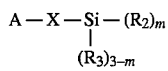

$$A-X-Si-(R_2)_m \atop (R_3)_{3-m} \qquad (II)$$

wherein X, $R_2$, $R_3$ and m have the meanings defined hereinabove, and A is a functional group capable of reacting with the carboxylic groups of the maleamic acids such as, for example, an amine, epoxy, mercaptane, ester, vinyl or halogen group.

A preferred method consists in reacting gamma-aminoalkylentrietoxysilane with maleic anhydride or a reactive derivative thereof, such as maleic acid or an alkylester or chloride thereof, at about 70° C., in nitrogen atmosphere, in a 1:1 molar ratio.

The polyolefin used in the composition of the present invention may be a homopolymer of ethylene and/or a copolymer of ethylene with at least one other alpha-olefin containing from 3 to 10 carbon atoms. Examples of such alpha-olefins are propylene, butene-1, hexene-1, heptene-1 and so on. When the polyolefin is a homopolymer of ethylene or a copolymer 5 thereof with a smaller amounts of at least one other $C_3$–$C_{10}$ alpha-olefin, such as for example from 2 to 25% by weight, the density of the polyolefin ranges from 0.85 to 0.97 g/cm³ and especially from 0.940 to 0.960 g/cm³.

The Melt Flow Index of the polyolefin is generally lower than 15 g/10 min. and preferably it is comprised between 2 and 10 g/10 min.

Although the high density polyolefins are preferred in the compositions of the present invention, low density polyolefins such as low density polyethylene (LDPE) or linear low density polyethylene (LLDPE), alone or in mixture between them, can be used, if desired, for particular applications or end uses.

These types of polymers are commercially known, for example, under the trade mark ESCORENE®LL 1201 XV (LLDPE) from Soc. EXXON; RIBLENE® AK 1912 (LDPE) from Soc. ENI-CHEM; ERACLENE® HUG 5013 (HDPE) from Soc. ENICHEM.

High density polyethylene (HDPE) is particularly preferred in the compositions of the present invention.

Any carbonate of a metal appertaining to IIa Group of the Periodic System available on the market may be used for preparing the compositions subject matter of the present invention.

Specific examples of such carbonates include calcium carbonate, barium carbonate, magnesium carbonate or mixtures thereof; calcium carbonate alone or in mixture with magnesium carbonate is particularly preferred.

The particle sizes of the filler may be important, as it is known in the art and are selected depending on the desired properties. Generally, fine particle sizes tend to provide products of higher impact strength than that of the products containing larger particle sizes, even if the stiffness decreases and higher amount of compatibilizing agent is necessary. Generally, the particle sizes of the carbonate of a metal appertaining to IIa Group of the Periodic System range from 0.02 to 40 micrometers and preferably from 0.07 to 10 micrometers.

Calcium carbonate is available on the market under the trade marks OMYACARD 2 UM from Soco OMYA, Huber H-White® from Soc. UMBRIA MINERARIA, and so forth.

The compositions of the present invention may be prepared by feeding the components of the composition, in any possible order, to any admixing apparatus suitable for producing thermoplastic compositions and by successively bringing the mixture to a temperature at least equal to the polymer melting temperature, such as from 180° to 220° C. Single-screw and twin-screw mixers, Banbury mixers and other known mixers for preparing blends of thermoplastic polymers can be used.

Instead of the maleamic silane of formula (I) as such, it is possible to mix with the IIa Group metal carbonate and the polymer, the precursor compounds of the additive, which, successively, during the hot mixing and moulding steps, react at least partially with one another to originate the additive of the above-reported formula (I).

Thus, for example, it is possible to mix with the carbonate and the polyolefin, alone or mixed together, the maleic anhydride and a reactive silane of formula (II).

The addition of the various components, including the above-said precursors, to obtain the final composition, can be carried out in any succession, provided that the final composition has a homogeneous structure.

After admixing the components, the compositions may be fed directly to an apparatus for the manufacture of articles, especially an injection moulding apparatus or to an apparatus for the extrusion of sheets or other profiles or to a blow moulding apparatus.

However, the composition will usually be first formed into comminuted shaped articles, such as for example, into pellets which subsequently are fed to an apparatus for the manufacture of shaped articles.

The reinforced polymeric compositions of the present invention are characterized by a high resilience (IZOD), especially at low temperatures such as, for example, at –40° C., and by a high fluidity, which make them particularly suitable to be used in the injection moulding. In fact, the Melt Flow Index of the compositions of the present invention is generally higher than 1.5 g/10 min. at 190° C. and 2.16 Kg.

Conventional additives and/or auxiliary compounds may be further incorporated, if it is necessary, to the compositions of the present invention, in order to improve the characteristics of thermal stability, stability to oxidation and to the light; other additives such as pigments, dyestuffs, flame-retardant agents, releasing agents, other types of thermoplastic resins or rubbers can be added to impart high impact properties. These additives are generally added in an amount comprised between 0.1 to 50% by weight.

For a better understanding of the present invention and to reduce it to practice, a few illustrative but do not limitative examples are given hereinafter.

In the examples, all parts and percentages are given by weight, if not differently indicated.

In the examples, for measuring the characteristics of the compositions, the following methods were used:

Mechanical properties

The IZOD resiliences with notch were measured at +23° C. and at −40° C., by operating according to the procedure of ASTM D 256, on test samples having a thickness of 3.2 mm; the elongation at break and the flexural modulus were measured using the procedure of ASTM D 638.

Thermal properties 5 The heat deflection temperature under a load of 0.455 MPa was measured using the procedure of the Standard ASTM D 648.

Rheological properties

The Melt Flow Index (M.F.I.) was measured using the procedure of ASTM D 1238, at 190° C. and at 2.16 kg.

EXAMPLES 1–6

The following components were charged into a dry-blend mixer:

high density polyethylene (HDPE), ERACLENE® HUG 5013, having a melt flow index of 4.5 g/10 min., in the amount reported in the Table, and calcium carbonate, produced and sold by Soc. OMYA under the trade name OMYACARD 2 UM® in the amount reported in the Table.

An amount reported in the Table of a maleamic silane of formula:

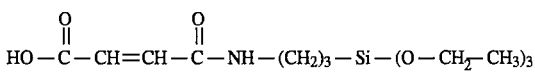

in solution at 10% by weight in a 90/10 weight ratio ethyl alcohol/water mixture was added to the resulting blend.

The mixtures thus obtained were gently mixed for 15 min. and then extruded through a ICMA San Giorgio MC-33 twin-screw extruder at a temperature of 230° C. and at 300 rpm.

The extruded product was injection moulded by using a Battenfeld 750 press at the following conditions:

Temperature of the cylinder and nozzle: 200° C.;

Temperature of the mould: 50° C.;

Injection time: 20 sec.;

Total time of the cycle: 45 sec.

The properties of the test samples thus obtained are listed in the following Table.

We claim:

1. A reinforced polyolefinic thermoplastic composition comprising:
   (A) from 30 to 98% by weight of a polyolefin selected from the group consisting of homopolymers of ethylene and copolymers of ethylene with at least one other alpha-olefin containing from 3 to 10 carbon atoms, and respectively
   (B) from 70 to 2% by weight of at least one carbonate of a metal appertaining to IIa Group of the Periodic System; and
   (C) from 0.01 to 10 parts by weight, based on 100 parts of (A)+(B), of a maleamic silane having general formula:

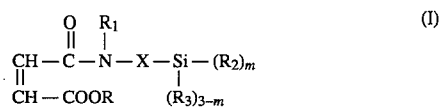

wherein:

R and $R_1$ are independently selected from hydrogen and an alkyl radical containing from 1 to 8 carbon atoms;

$R_2$ is an alkoxy hydrolysable group containing from 1 to 6 carbon atoms or a halogen atom; $R_3$ is an alkyl radical containing from 1 to 8 carbon atoms;

X may be a radical of formula:

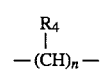

or an aromatic, cycloaliphatic or heterocyclic divalent radical, wherein $R_4$ is hydrogen or an alkyl radical containing from 1 to 18 carbon atoms and n is an integer ranging from 1 to 4; and m is an integer ranging from 1 to 3, extremes included.

2. The reinforced polyolefinic composition according to claim 1, characterized in that it comprises from 50 to by weight of a polyolefin (A), from 50 to 20% by weight of a carbonate of a metal appertaining to IIa Group of the Periodic System (B), and from 0,05 to 5% by weight, based on the (A)+(B) mixture, of the maleamic silane (C) of formula (I).

TABLE I

| COMPONENTS | EXAMPLES | | | | | |
|---|---|---|---|---|---|---|
|  | 1* | 2 | 3 | 4 | 5 | 6 |
| HDPE (kg) | 70 | 70 | 70 | 70 | 80 | 60 |
| OMYCARB 2 UM (kg) | 30 | 30 | 30 | 30 | 20 | 40 |
| MELEAMIC SILANE (kg) | — | 0,5 | 1 | 1,5 | 1,5 | 1,5 |
| MECHANICAL PROPERTIES | | | | | | |
| IZOD a +23° C. (J/m) | 65 | 400 | 500 | 520 | 550 | 340 |
| IZOD a −40° C. (J/m) | 45 | 250 | 300 | 320 | 340 | 220 |
| Elongation at break (%) | 370 | 280 | 250 | 220 | 380 | 160 |
| Flexural modulus (MPa) | 1800 | 1850 | 1900 | 1900 | 1800 | 2100 |
| THERMAL PROPERTIES | | | | | | |
| HDT at 0,455 MPa. (°C.) | 110 | 109 | 109 | 109 | 108 | 113 |
| REOLOGICAL PROPERTIES | | | | | | |
| M.F.I. (g/10 min) | 2,1 | 2,1 | 2,1 | 2,2 | 2,8 | 1,8 |

*Comparison example.

3. The reinforced polyolefinic composition according to claim 1 or 2, characterized in that the maleamic silane (C) has formula (I), wherein R and $R_1$ are hydrogen; $R_2$ is a straight or branched alkoxy radical containing from 1 to 4 carbon atoms; $R_4$ is hydrogen; n is 2 or 3, and 3- m is zero.

4. The reinforced polyolefinic composition according to claim 3, characterized in that $R_2$ is selected from the group consisting of —O—$CH_3$, —O—$C_2H_5$, —O—$C_3H_7$ and —O—$C_4H_9$.

5. The reinforced polyolefinic composition according to claim 1, wherein the polyolefin is selected from a homopolymer of ethylene and a copolymer of ethylene with 2–25% by weight of at least one other alpha-olefin containing from 3 to 10 carbon atoms.

6. The reinforced polyolefinic composition according to claim 5, wherein the polyolefin has a density ranging from 0.85 to 0.97 g/cm$^3$ and a Melt Flow Index lower than 15 g/10 min.

7. The reinforced polyolefinic composition according to claim 5 or 6, wherein the polyolefin has a density ranging from 0.940 to 0.960 g/cm$^2$ and a Melt Flow Index ranging from 2 to 10 g/10 min.

8. The reinforced polyolefinic composition according to claim 1, wherein the carbonate of a metal appertaining to IIa Group of the Periodic System is in the form of particles having sizes ranging from 0.02 to 40 micrometers.

9. The reinforced polyolefinic composition according to claim 1 which comprises one or more additives selected from the group consisting of stabilizers, pigments, dyestuffs, flame-retardant agents, releasing agents, other thermoplastic resins, and rubbers in an amount of between 0.1 to 50% by weight.

* * * * *